US011872179B1

(12) United States Patent
Wilson et al.

(10) Patent No.: US 11,872,179 B1
(45) Date of Patent: Jan. 16, 2024

(54) PERCUSSION PADDLE

(71) Applicant: Modern Pulmonary Products, LLC, McAllen, TX (US)

(72) Inventors: Paul Wilson, McAllen, TX (US); Lutz Blume, Mission, TX (US); Humberto Alvarez, Jr., Pharr, TX (US)

( * ) Notice: Subject to any disclaimer, the term of this patent is extended or adjusted under 35 U.S.C. 154(b) by 0 days.

(21) Appl. No.: 17/956,590

(22) Filed: Sep. 29, 2022

Related U.S. Application Data

(60) Provisional application No. 63/249,983, filed on Sep. 29, 2021.

(51) Int. Cl.
*A61H 23/06* (2006.01)
*A61H 9/00* (2006.01)
*A61H 23/00* (2006.01)

(52) U.S. Cl.
CPC ........... *A61H 23/06* (2013.01); *A61H 9/0057* (2013.01); *A61H 2009/0064* (2013.01); *A61H 2023/002* (2013.01); *A61H 2201/0157* (2013.01); *A61H 2201/0188* (2013.01); *A61H 2201/1635* (2013.01); *A61H 2201/5028* (2013.01); *A61H 2201/5043* (2013.01); *A61H 2201/5048* (2013.01); *A61H 2201/5058* (2013.01); *A61H 2205/084* (2013.01)

(58) Field of Classification Search
CPC .................. A61H 23/06; A61H 9/0057; A61H 2009/0064; A61H 2023/002; A61H 2201/0157; A61H 2201/0188; A61H 2201/1635; A61H 2201/5028; A61H 2201/5043; A61H 2201/5048; A61H 2201/5058; A61H 2205/084
USPC .................................. 601/41, 107, 137, 138
See application file for complete search history.

(56) References Cited

U.S. PATENT DOCUMENTS

| | | | | | |
|---|---|---|---|---|---|
| 2,879,765 | A * | 3/1959 | Featherston | A61H 9/005 | D8/71 |
| 4,196,722 | A * | 4/1980 | Vanderwoude | A61H 31/007 | 601/41 |
| 4,429,688 | A * | 2/1984 | Duffy | A61H 31/00 | 601/41 |
| 4,745,910 | A * | 5/1988 | Day | A61H 23/06 | D24/142 |
| 2008/0188834 | A1* | 8/2008 | Balducci | A61H 23/008 | 604/540 |
| 2008/0312565 | A1* | 12/2008 | Celik-Butler | G09B 23/288 | 73/488 |
| 2011/0098611 | A1* | 4/2011 | Flood | A61M 16/06 | 601/149 |
| 2012/0130291 | A1* | 5/2012 | Dillingham | A61H 23/006 | 601/107 |

(Continued)

FOREIGN PATENT DOCUMENTS

CN 114392165 A * 4/2022

*Primary Examiner* — Tu A Vo
*Assistant Examiner* — Kelsey E Baller
(74) *Attorney, Agent, or Firm* — Jason E McKinnie

(57) ABSTRACT

A percussion paddle device for use in chest physical therapy-comprising a handle and cup positioned at one terminal end of the handle. The cup is made of a pliable plastic and has a cushion positioned long its exterior rim. In use, the percussion paddle is swung at a patient such that the cushion is flush with the patient creating seal. The resulting build up of pressure mimics the force of a cupped hand.

9 Claims, 8 Drawing Sheets

(56) References Cited

U.S. PATENT DOCUMENTS

| | | | | |
|---|---|---|---|---|
| 2015/0231025 | A1* | 8/2015 | Shankland | A61H 23/06<br>601/107 |
| 2022/0313544 | A1* | 10/2022 | Lee | A61H 23/02 |
| 2022/0387678 | A1* | 12/2022 | Park | A61M 1/80 |

* cited by examiner

PERCUSSION PADDLE

CROSS-REFERENCES TO RELATED APPLICATIONS

This application claims the benefit of United States Provisional Application Ser. No. 63/249,983, filed Sep. 29, 2021 entitled Percussion Paddle which is incorporated by reference herein.

STATEMENT REGARDING FEDERALLY SPONSORED RESEARCH OR DEVELOPMENT

Not applicable.

BACKGROUND OF THE INVENTION

1. Field of the Invention.

The present invention relates to a percussion paddle used for chest physical therapy.

2. Background of the Related Art.

Typical chest physical therapy is provided by patting the patient's back with cupped hands. Chest therapy is used to break up mucus in a patient's lungs and help remove fluid and mucus. This therapy, while widely used, is susceptible to misuse by the therapist or ineffective treatment if enough pressure and force is not used. Furthermore, chest physical therapy is tiring for the therapist as it requires physical exertion to implement the therapy. A therapist that tires during the treatment may result in stopping the therapy or not applying the appropriate impact force. Furthermore, the physical strength of therapists and the physical force of the necessary therapy for patients also varies. For example, a pediatric patient may need less physical force than an adult. The current art requires a therapist to know the difference of forces necessary and then manually vary the levels of force depending on the situation and patient. A reliable method is needed to reduce the physical burden on the therapist, provide consistent pressure for the designated therapy, and provide variable pressure depending on the patient.

SUMMARY OF THE INVENTION

The present invention comprises a handle and a cup. The handle, having first terminal end and a second terminal end, is curved with finger grip towards the first terminal end. A connection portion extends from the second terminal end. A cup, having a cylindrical receiving portion at its apex, attaches to the connection portion. Tabs positioned on the receiving portion frictionally engage with slots on the connecting portion. A cushion is attached circumferentially around the rim of the cup.

A pressure valve may be placed within the connection portion of the handle. The pressure valve makes a whistle sound if too much pressure builds up within the cup upon impact.

An impact sensor may be placed in the handle and is electronically connected to a series of LED lights and a screen positioned in the handle and visible to the operator. A first LED light is powered on when a certain impact force is obtained indicating acceptance of the strike. A second LED light, such as red, may be powered on if the impact force is below a certain threshold. The impact sensor may also update a counter to indicate the number of correct impacts implemented to aid the operator in complying with the designated therapy and number of impacts.

In operation, the percussion paddle is swung at a patient's chest or back such that the cushion contacts the patient's skin. The cushion should be flush with the patient upon impact. The harder the swing, and the resulting impact, the more pressure builds inside the cup.

DETAILED DESCRIPTION OF THE INVENTION

Figure 1:
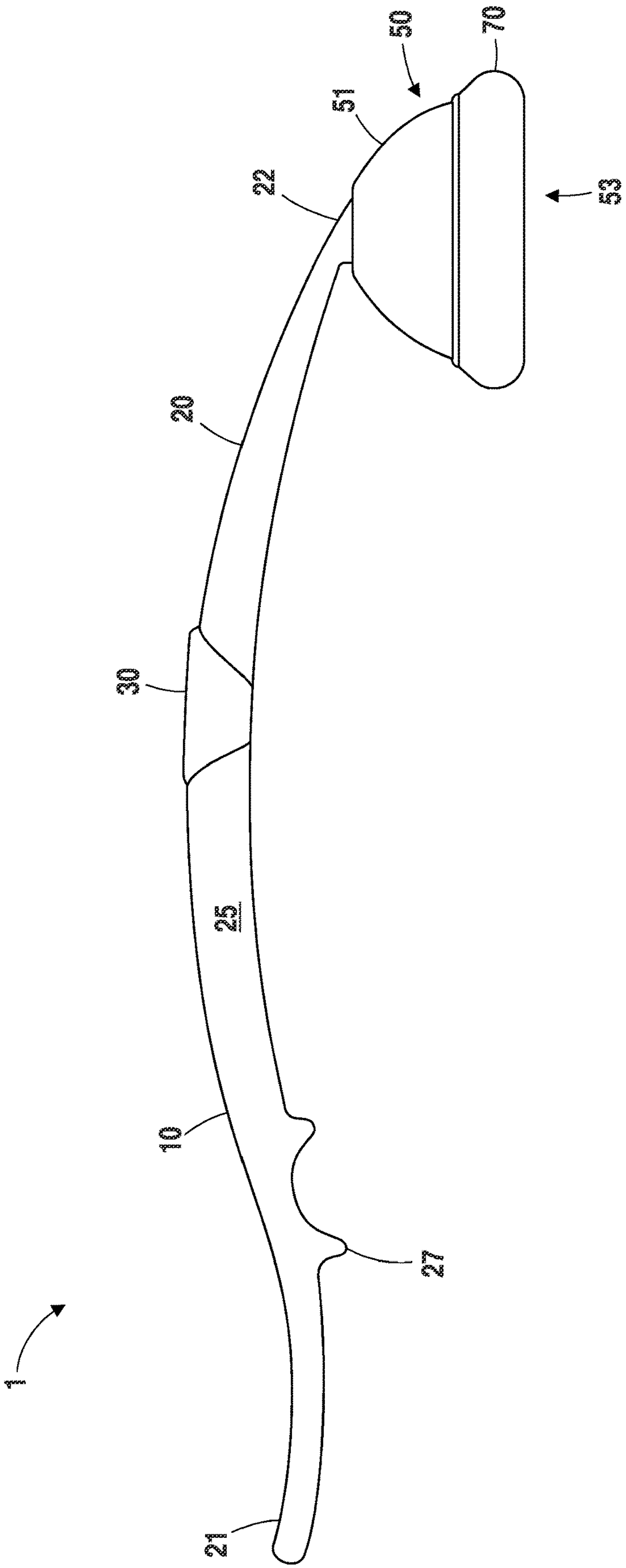
FIG. 1 is a side view of an embodiment of the percussion paddle.
Figure 2:
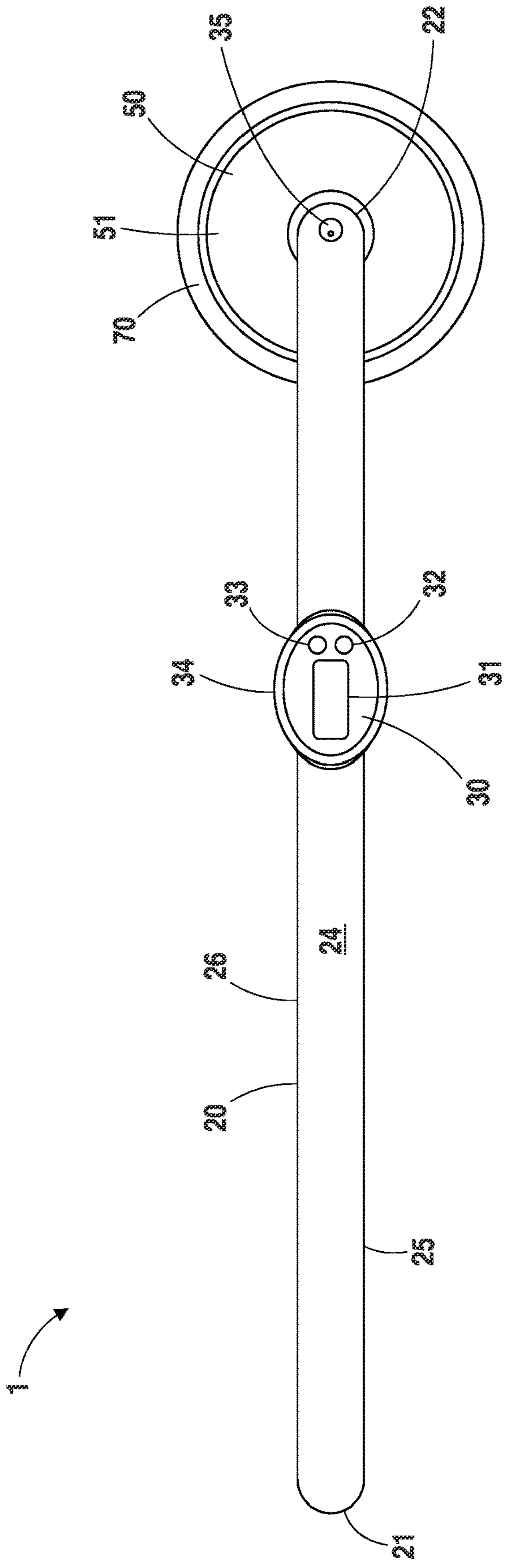
FIG. 2 is a top view of an embodiment of the percussion paddle.

As seen in FIGS. 1-8, the percussion paddle 1 comprises a handle 10 and a cup 50. The handle 10 comprises a shaft 20 and a connecting portion 40. The shaft 20, having a first terminal end 21, second terminal end 22, bottom face 23, top face 24, first side face 25, and second side face 26, is generally arc shaped with the top face 24 having a longer arc length than the bottom face 23. The arc shape flattens out towards the first terminal end 21. A finger grip 27 extends from the bottom face 23 and is positioned where the arc shape begins to flatten out near the first terminal end 21. An exit hole 35 is positioned through the top face 24 at the second terminal end 22.

Figure 8:
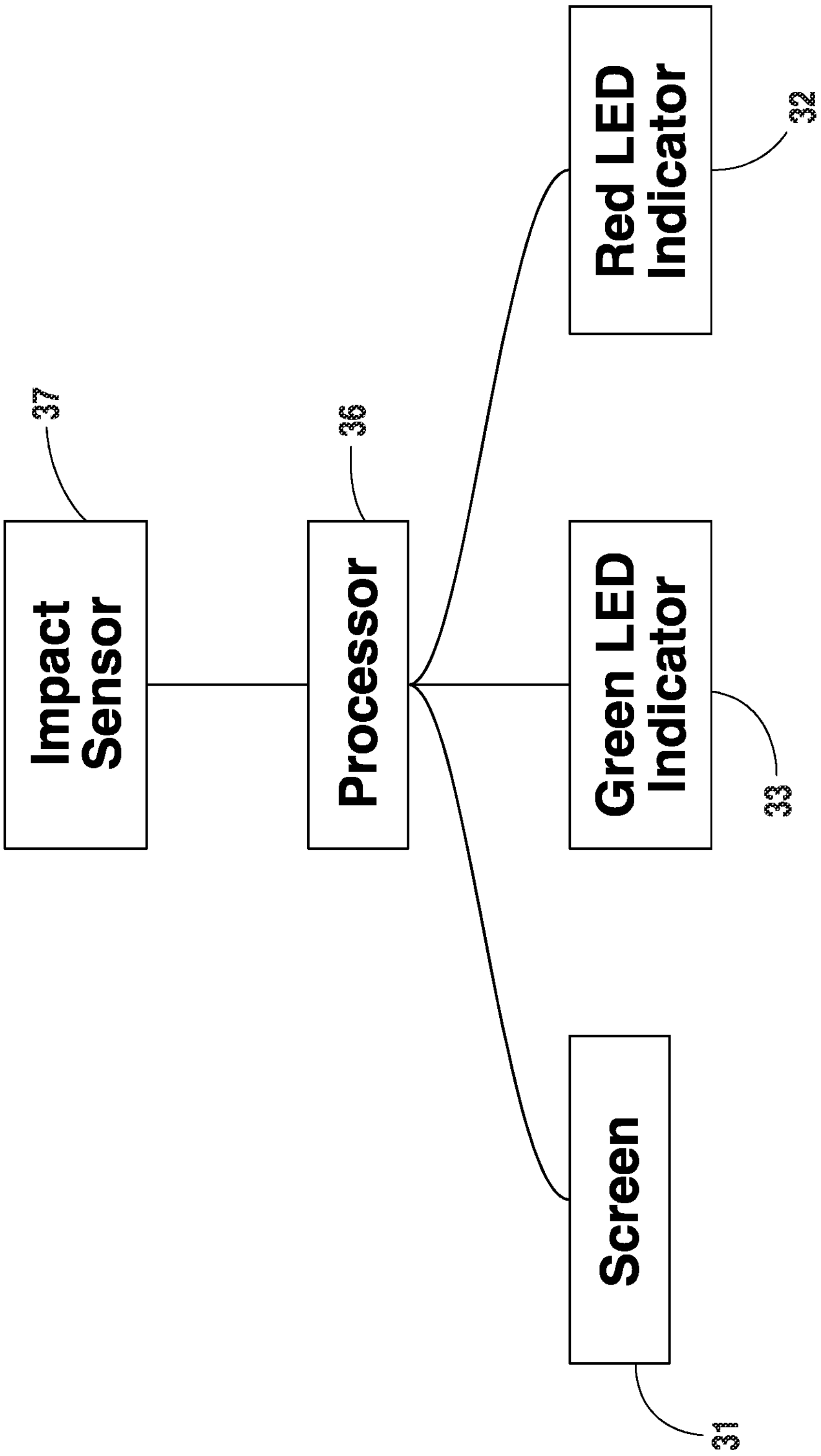
FIG. 8 is a schematic diagram of the electronic components of the percussion paddle.

A display assembly 30 is positioned in the top face 24 generally between the finger grip 27 and the second terminal end 22. The display assembly 30 comprises a screen 31, a red LED indicator 32, and a green LED indicator 33 positioned on the top surface 34, an impact sensor 37, and a processor 36. As seen in FIG. 8, the screen 31, a red LED indicator 32, a green LED indicator 33, and impact sensor 37 are in communication with the processor 36. In one embodiment, the processer 36 and a power source are positioned within the shaft 20. Power for the display assembly 30 may be obtained through kinetic energy as it is preferable to utilize a processor, screen, indicator lights, and sensors that have low power consumption. Power may also be supplied via replaceable and/or chargeable battery.

Figure 5:
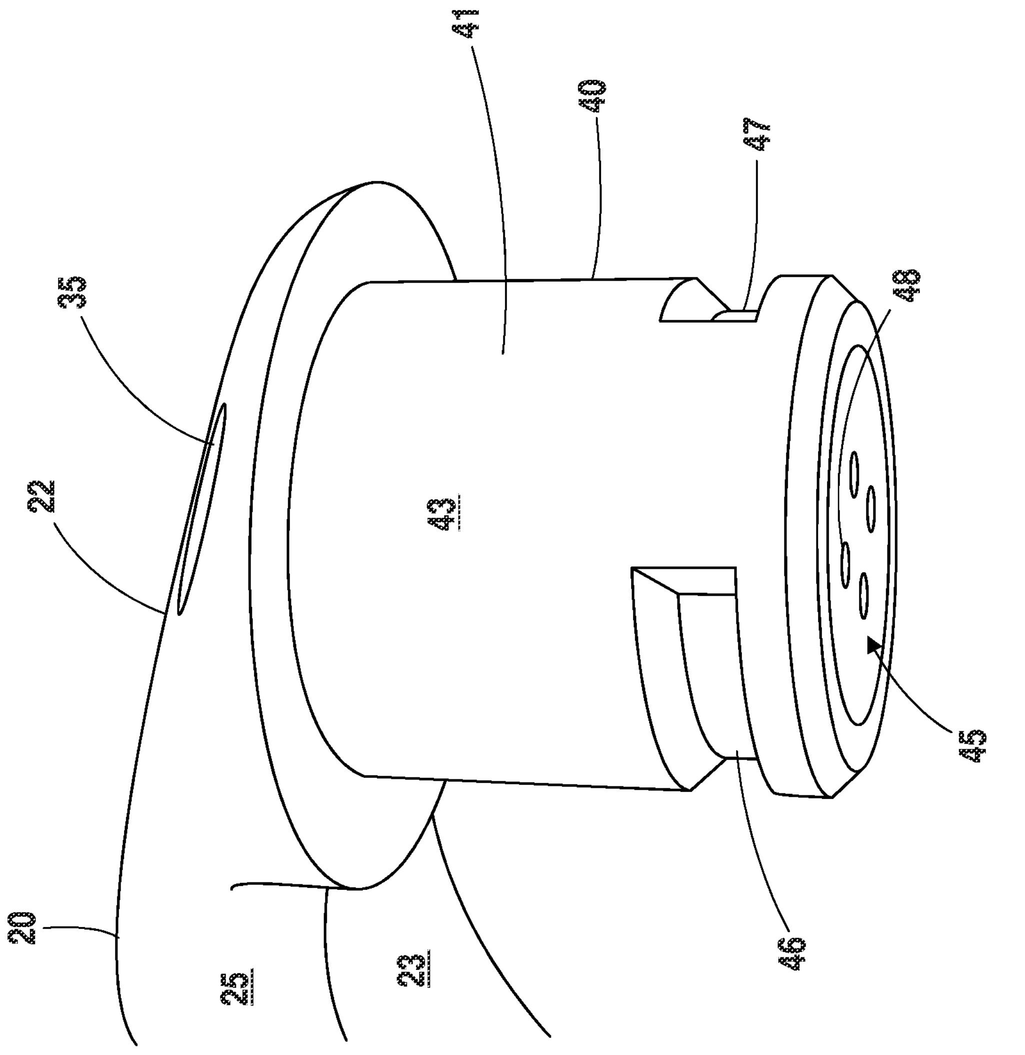
FIG. 5 is a underneath perspective view of the connecting portion of the handle of the percussion paddle.
Figure 6:
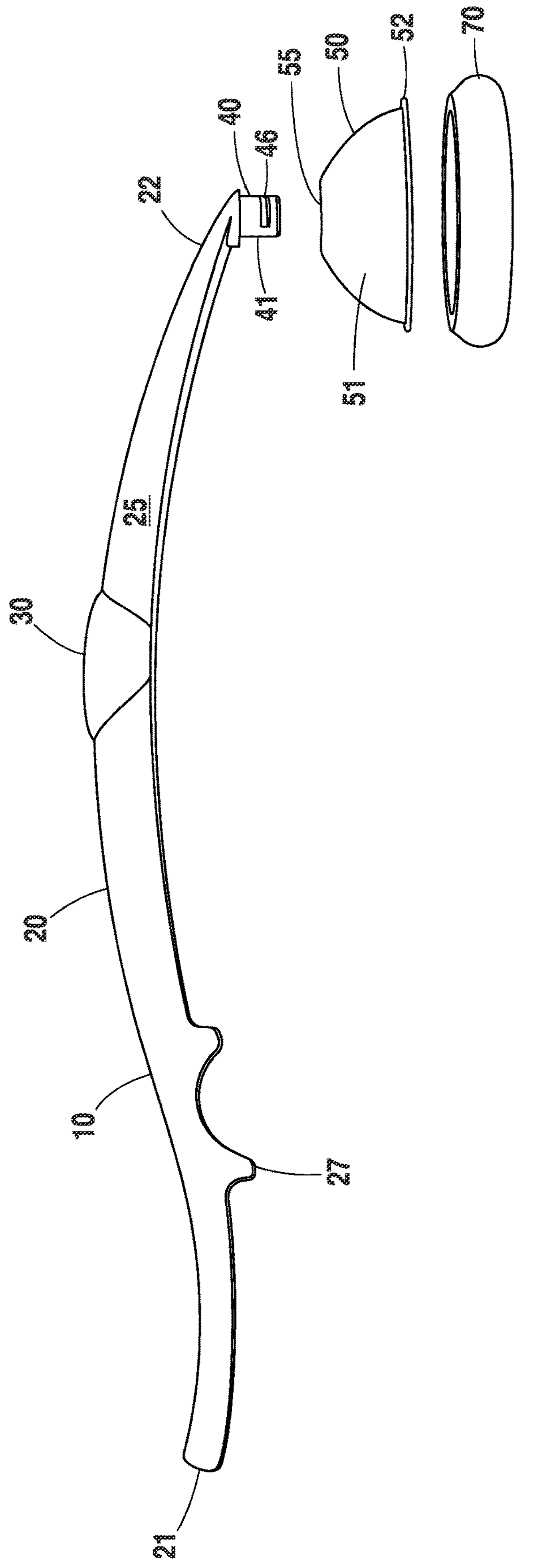
FIG. 6 is an exploded view of the percussion paddle.
Figure 7:
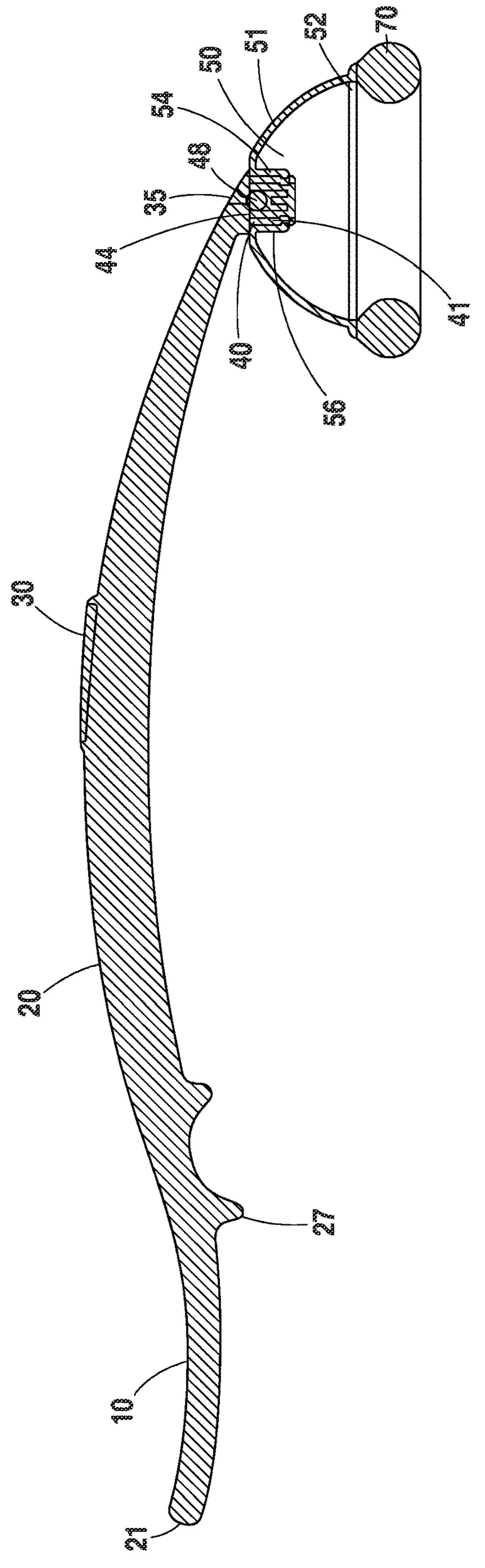
FIG. 7 is a cross section view of FIG. 1.

As seen in FIGS. 5-7, the connecting portion 40 comprises a cylindrical sidewall 41 extending from the bottom face 23 of the shaft 20 at the second terminal end 22. The cylindrical sidewall 41 comprises an inner sidewall surface, outer sidewall surface 43, inner top sidewall 44, and opening 45. A first slot 46 and second slot 47 are positioned within the outer sidewall surface 43 with the first slot 46 aligned with the first side face 25 and second slot 47 aligned with the second side face 26.

Figure 3:
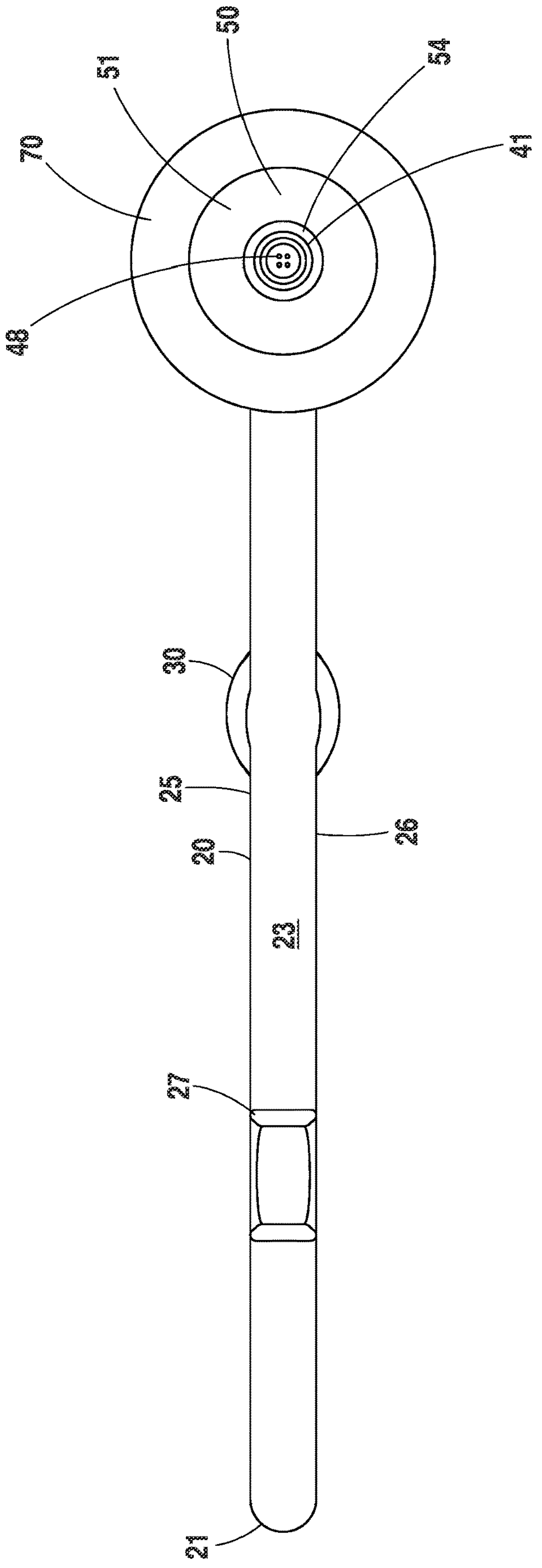
FIG. 3 is a bottom view of an embodiment of the percussion paddle.
Figure 4:
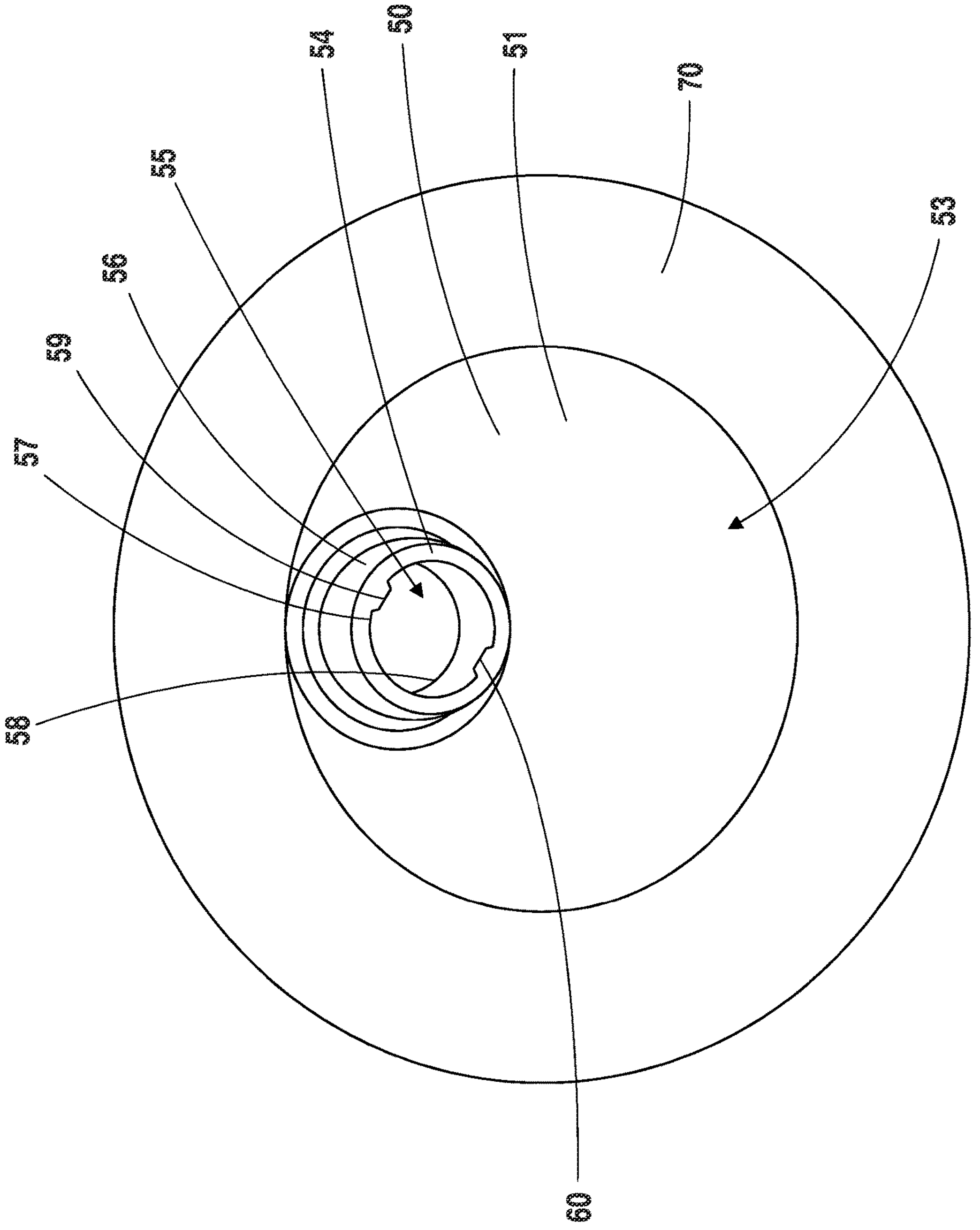
FIG. 4 is a underneath perspective view of an embodiment of the cup portion of the percussion paddle.

As seen in FIGS. 3, 5, and 7, a pressure valve 48 is positioned within the cylindrical sidewall 41 of the connecting portion 40 and may be flush with the opening 45 of the cylindrical sidewall 41. The pressure valve 48 is in communication with an exit hole 35 on the top face 24 of the shaft 20. The exit hole 35 may further comprise a whistle that produces an audible sound upon release of pressure through the exit hole 35. The placement of the pressure valve 48 within the cylindrical sidewall 41, prevents any air from escaping through the opening 45 of the cylindrical sidewall 41 except to the extent pressure exceeds the rating of the pressure valve 48 and air is released through the exit hole 35.

A cup 50 is semi spherical in shape having a semi spherical sidewall 51 and a rim 52 defining an opening 53. A receiving portion 54 is positioned at the apex 55. The receiving portion 54 comprises a cylindrical sidewall 56 having a bottom edge 57 and a top edge 58. A first tab 59 and a second tab 60 are positioned along the bottom edge 57 of the cylindrical sidewall 56 and face inward towards each other (oppose each other). The cylindrical sidewall 56 of the receiving portion 54 has a larger diameter than the cylindrical sidewall 41 of the connecting portion 40 such that cylindrical sidewall 41 can frictionally fit within the cylindrical sidewall 56 of the receiving portion 54. The length of the sidewall 56 of the receiving portion 54 is approximately the same as the cylindrical sidewall 41 of the connecting portion 40. The first tab 59 fits within the first slot 46 and the second tab 60 fits with the second slot 47. A cushion 70 is attached to the rim 52 and extends along the circumference of the rim 52. The cushion 70 is attached to the rim 52 in such a manner so as to create a seal between the cushion and the semi spherical sidewall 51 at the rim 52.

As seen in FIG. 6, the cup 50 attaches to the handle 10. The connecting portion 40 is slid into the receiving portion 54 of the cup 50 until a portion of the semi spherical sidewall 51 near the apex 55 abuts the bottom face 23 of the handle 10. The first tab 59 and second tab 60 fit within the first slot 46 and second slot 47 respectively. The length of the first slot 46 and second slot 47 allow for the tabs 59, 60 to rotate circumferentially within the slots 46, 47. The friction fit of the cylindrical sidewall 41 of the connecting portion 40 within the cylindrical sidewall 56 of the receiving portion 54 helps prevent leakage of air from inside the cup 50 upon pressurization due to an impact and helps prevent non-rotational movement of the cup 50 in relation to the handle 10. Once assembled and when impact correctly causes the cushion 70 to contact the patient, no air may escape from the interior of the cup except through the exit hole 35 when pressure exceeds the pressure rating of the pressure valve 48.

As seen in FIG. 8, the impact sensor 37 is in communication with a processor 36. The processor 36 is in communication with the screen 31, green LED indicator 33, and red LED indicator 32. The processor 36 stores a predetermined threshold value for impact force through non-transitory computer readable storage or accessing non-transitory computer readable medium. The screen 31 may display information useful to the operator such as the number of successful impacts or duration of therapy. The impact sensor 37 measures the impact force of the strike and electronically sends the information to the processor. The processor 36 compares the measured impact force to a threshold impact force stored in non-transitory computer readable storage. If the impact force as measured equals or is greater than the threshold impact force, the processor 36 activates the green LED indicator 33 and increases the strike count by 1 as displayed on the screen 31. If the impact force is less than the threshold impact force, the processor 36 activates the red LED indicator 32 and does not increase the strike count as displayed on the screen 31.

The screen assembly 30 may include other functionality and settings. For example, the screen assembly 30 may be used to a set a duration of therapy, the desired impact force threshold as it may vary by patient or treatment protocol, number of impacts, etc. Such information may be stored in the processor 36 or other standards means of electronic storage used in simple processing environments. The screen 31 may be any number of standard graphical user interfaces, including touch capability, with the ability to display information relevant to the settings to assist the operator in providing the proper therapy. Other embodiments may include an alarm or indicator upon completion of a therapy session such as the completion of duration or of the number of impacts. The processor 36 is capable of making comparisons, making determinations, and communicating instructions to connected devices.

The pressure valve 48 is preferably a pressure relief valve connected to an audible noise maker such as a whistle. If the pressure within the interior of the cup 50 exceeds a certain pressure upon impact, the pressure valve 48 releases air through the exit hole 35. As the air is released, it passes a noise maker, such as a whistle, to make an audible sound. If the pressure inside the cup 50 does not exceed the pressure rating of the pressure valve 48, then no sound is heard.

In operation, the preferred embodiment of the percussion paddle is swung at a patient's back or chest such that the cushion 70 contacts the patient's skin. The operator holds the handle 10 at the finger grip portion 27 and swings the percussion paddle 1 with the cushion 70 facing the patient. Upon contact of the patient, the cushion 70 should be flush with the patient to create a momentary seal between the patient and interior of the cup 50. The harder the swing, and/or longer the handle 10, the more pressure builds inside the cup 50 upon contact. Upon contact, the impact sensor 37 measures the impact force and communicates the reading to the processor 36. If the impact force exceeds a minimum threshold, it is considered a good strike and the processor 36 activates the green LED indicator 33 and increases the strike count by one as displayed on the screen 31. If the minimum threshold is not reached, then it is not considered a good strike and the processor 36 activates the red LED indicator 32 and does not change the strike count displayed on the screen 31. If the operator swings the percussion paddle 1 with too much force creating too much impact, air is released through the pressure valve 48 making an audible sound. This alerts the user that the previous strike and resulting impact was too hard. The operator continues the therapy until the desired number of appropriate strikes is met as identified by the screen 31. Once the therapy session is over, the counter, as displayed on screen 31, may be reset.

The handle 10 is preferably made of a hard, but pliable plastic. The handle 10 may also be made of a non-pliable plastic. The arc of the shaft 20 assists the operator in generating a powerful strike with ease to ensure flush contact of the cushion against the patient. The cup 50 is preferably made of a pliable plastic. The air cushion 70 is preferably made of a pliable plastic that is more pliable than the cup 50 and handle 10. The handle 10 length and cup 50 size may be varied to distinguish between pediatric and adult use. A longer handle 10 allows the operator to generate more force. A smaller cup size may also concentrate the force over a smaller area on the patient. The cup 50 and/or cushion 70 may be replaced between patients or after extensive wear.

In another embodiment, the percussion paddle 1 does not utilize any electronic componentry and comprises the handle 10, cup 50, and cushion 70 with the pressure valve 48.

In another embodiment, the percussion paddle 1 does not utilize any electronic componentry or valves and comprises the handle 10, cup 50, and cushion 70.

In another embodiment, the processor may have a range of impact forces and the display may have more than two indicator lights. For example, the range of impact force may permit an acceptable strike, not acceptable strike, or a caution strike wherein it is at the cusp of not being an acceptable strike. Alternatively, the percussion paddle may have audible indicators in which the percussion paddle beeps upon a non-acceptable strike instead of displaying a red light.

In another embodiment, the display may only have one indicator light to indicate a sufficient impact force per strike was achieved. In this embodiment, the processor compares the input of the impact force as measured by the impact sensor and compares it to a predetermined threshold. If the measured impact force equals or exceeds the threshold, then the processor actives an indicator light. The processor may be set to activate the indicator light upon a successful strike or alternatively, upon a non-successful strike. The counter will only advance upon acceptable strikes.

In another embodiment, the pressure valve may be set to release an audible sound to indicate a sufficient impact force of strike was achieved. In this embodiment the impact sensor would indicate if the impact force was too hard.

Multiple combinations of settings may be used to achieve the desired result as to indicate whether the impact force was too much or too little to include measurements based on the impact sensor resulting in activation of a visual indicator light(s), audible indicators, and/or audible releases from the pressure relief valve.

The description of the present invention has been presented for purposes of illustration and description and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. It will be understood by one of ordinary skill in the art that numerous variations will be possible to the disclosed embodiments without going outside the scope of the invention as disclosed in the claims.

We claim:

1. A percussion paddle comprising a handle having a first terminal end and a second terminal end wherein the handle comprises a shaft and a connecting portion extending from the second terminal end and a bottom face of the shaft; and a dome shape cup having a sidewall, wherein the sidewall further comprises an edge defining a first opening and a receiving portion opposite the edge defining a second opening wherein the connecting portion is frictionally engaged within the receiving portion;

wherein the connecting portion further comprises a pressure relief valve in fluid communication with an exit hole on the handle; and wherein the pressure relief valve is in communication with an audible indicator that is configured to produce a sound upon release of pressure through the exit hole in response to the dome shape cup striking a treatment area.

2. The percussion paddle of claim 1 wherein a cushion is attached to the edge of the cup.

3. The percussion paddle of claim 2 wherein the shaft is arced shape.

4. The percussion paddle of claim 3 further comprising an impact sensor, a processor, and at least one indicator wherein the impact sensor and at least one indicator are in communication with the processor.

5. The percussion paddle of claim 4 wherein the at least one indicator is a light.

6. The percussion paddle of claim 4 further comprising an electronic display in communication with the processor.

7. The percussion paddle of claim 2 wherein the sidewall is a semi spherical in shape with the second opening positioned at or near an apex of the sidewall.

8. The percussion paddle of claim 4 wherein the processor is configured to receive an input value from the impact sensor, compare the input value to a predetermined threshold value, and if the input value is greater than the threshold value, transmit an instruction to one of the at least one indicator to activate.

9. The percussion paddle of claim 1 wherein the connecting portion and the receiving portion are cylindrical wherein a diameter of the connecting portion is smaller than the a diameter of the receiving portion.

* * * * *